United States Patent [19]
Nishio et al.

[11] Patent Number: 6,142,535
[45] Date of Patent: Nov. 7, 2000

[54] SYNTHETIC RESIN-MADE FASTENING-LIMITING DEVICE FOR A JOINT FASTENING MEMBER

[75] Inventors: Kiyoshi Nishio; Makoto Fujii; Yutaka Okamoto; Takuya Ishida, all of Sanda, Japan

[73] Assignee: Nippon Pillar Packing Co., Ltd., Osaka-fu, Japan

[21] Appl. No.: 09/151,703

[22] Filed: Sep. 11, 1998

[30] Foreign Application Priority Data

Sep. 19, 1997 [JP] Japan ................................ 9-255318

[51] Int. Cl.[7] .................................................. F16L 55/00
[52] U.S. Cl. .............................. 285/92; 285/93; 285/331; 285/334.5; 285/342; 285/423; 285/906
[58] Field of Search ............................. 285/92, 93, 331, 285/334.5, 342, 423, 906

[56] References Cited

U.S. PATENT DOCUMENTS

| | | | |
|---|---|---|---|
| 4,452,473 | 6/1984 | Ruschke | 285/92 X |
| 4,785,858 | 11/1988 | Valentini | 285/92 X |
| 4,940,260 | 7/1990 | Odriozola | 285/92 X |
| 5,188,398 | 2/1993 | Parimore et al. | 285/92 X |
| 5,215,336 | 6/1993 | Worthing | 285/92 X |
| 5,746,454 | 5/1998 | Webb | 285/92 |
| 5,851,035 | 12/1998 | Marc et al. | 285/92 X |

FOREIGN PATENT DOCUMENTS 819421   9/1959   United Kingdom .................... 285/92

Primary Examiner—Dave W. Arola
Attorney, Agent, or Firm—Jones, Tullar & Cooper, P.C.

[57] ABSTRACT

The present invention relates to a fastening-limiting device for a fastening member which fastens a pipe inserted into a pipe receiving port on the side of a joint. The fastening-limiting device has a ring portion which is fittable onto the outside of the pipe receiving port. A beam portion is formed on the ring portion. A protrusion is formed on the beam portion. A first abutting portion which is to abut against a reference face on the side of the joint is formed on one end of the ring portion. A second abutting portion which is to abut against a confronting portion of the fastening member is formed on the other end of the ring portion. A gap between the first and second abutting portions and is equal to the gap between the reference face and the confronting portion at the time when the fastening member exerts a sealing property and a function of preventing slipping-off. According to the present invention, when an appropriate sealing property of the pipe connection portion and prevention of slipping-off of the pipe are to be attained, the screw amount of the fastening member can be appropriately determined without dispersion.

13 Claims, 9 Drawing Sheets

Fig. 1
(a)
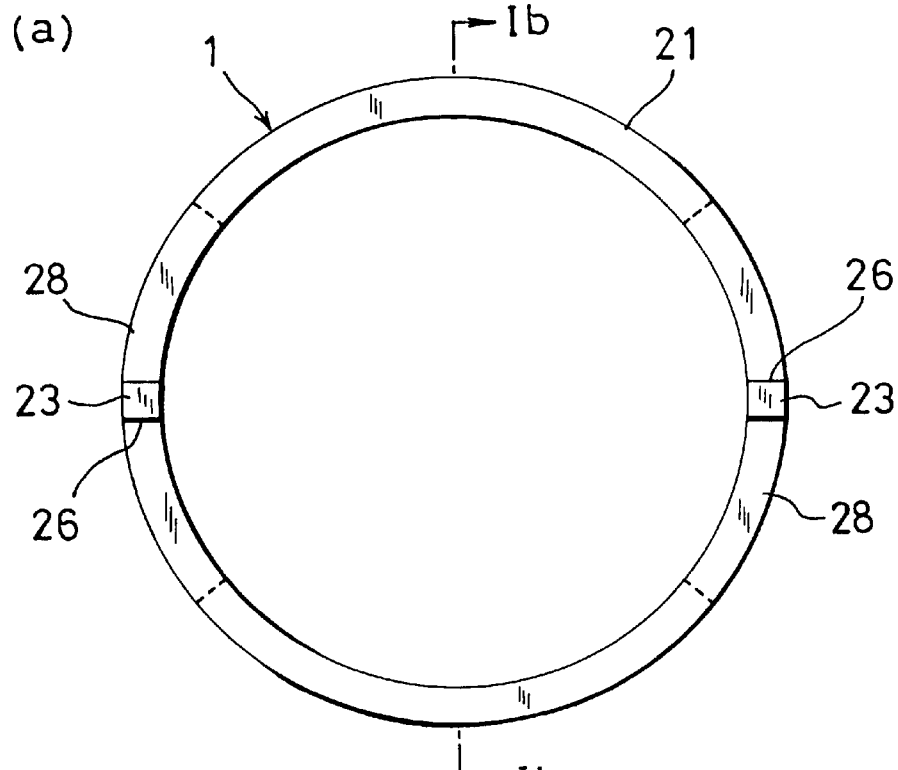
(b)
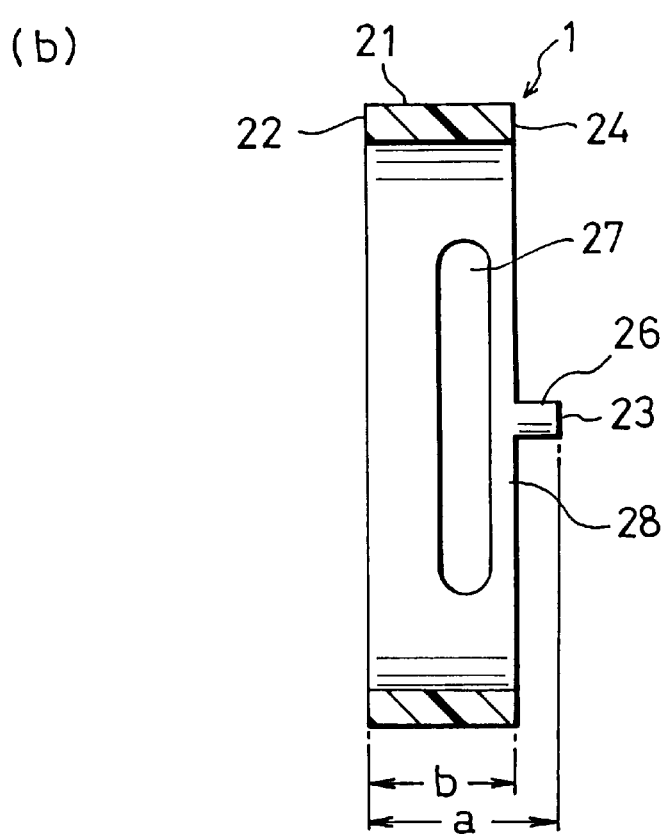

Fig. 2
(a)
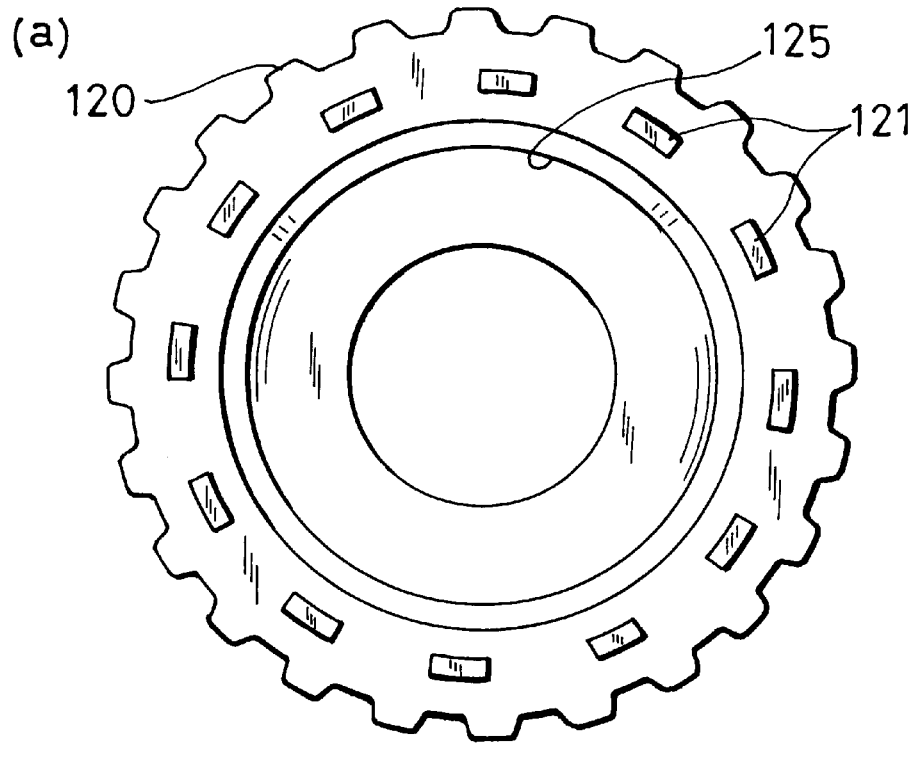
(b)
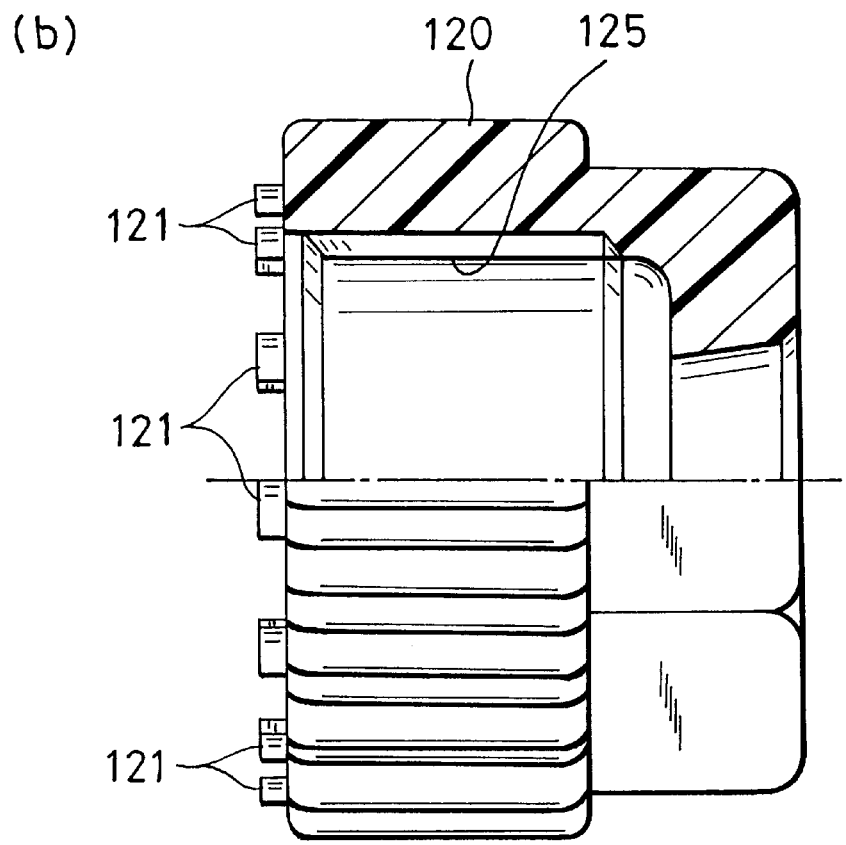

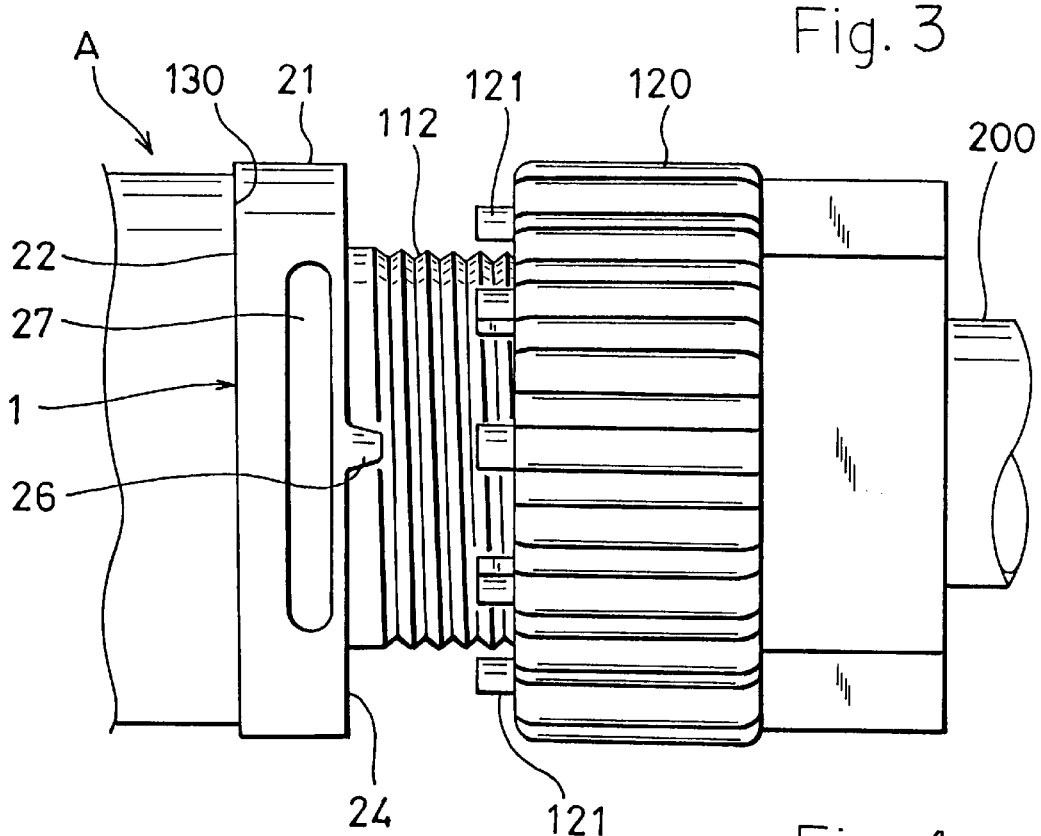
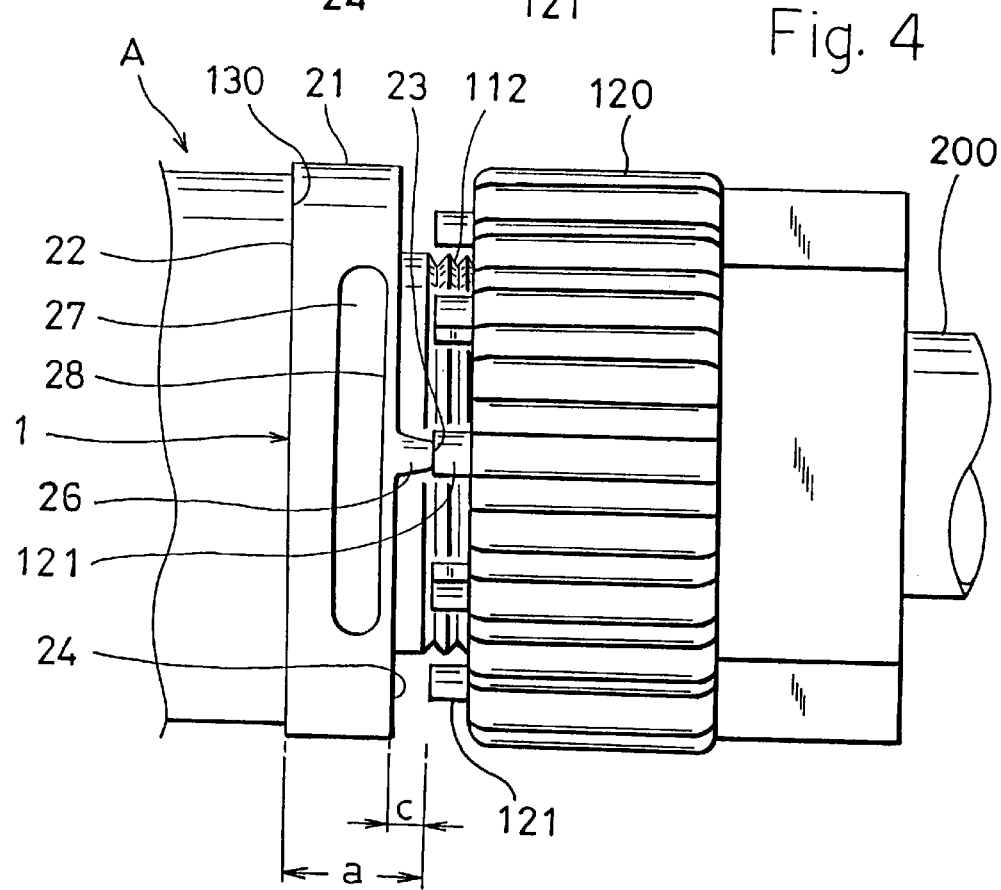

Fig. 8
(a)
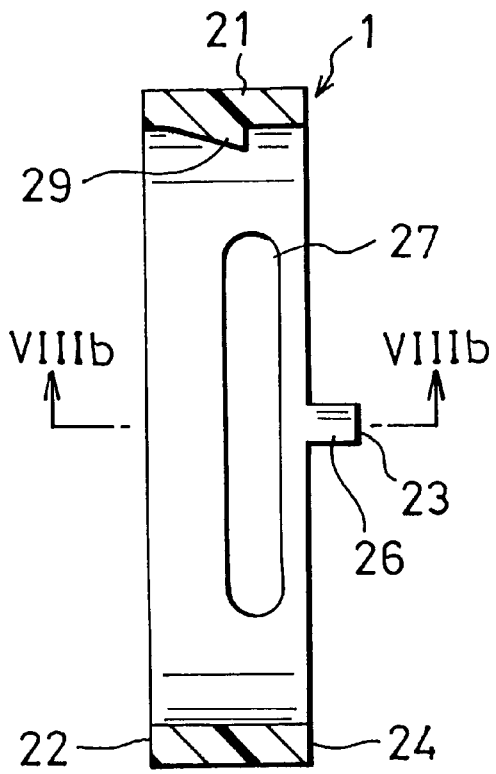
(b)
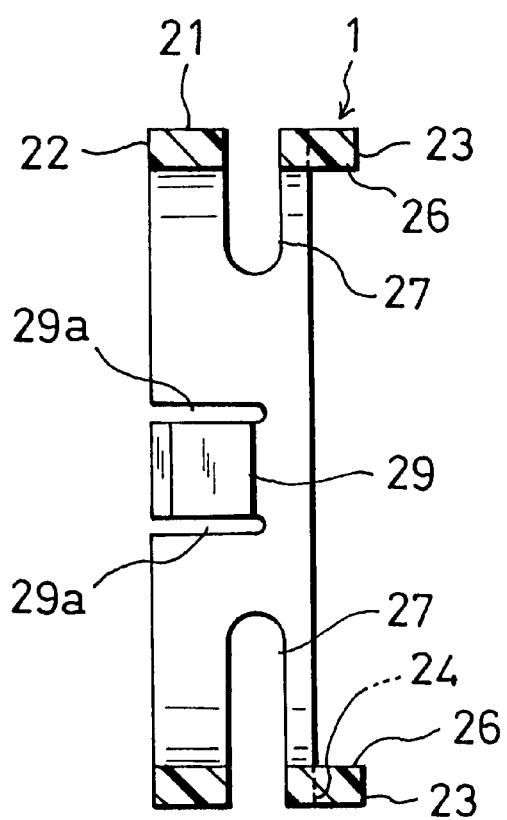

Fig. 10
(a)
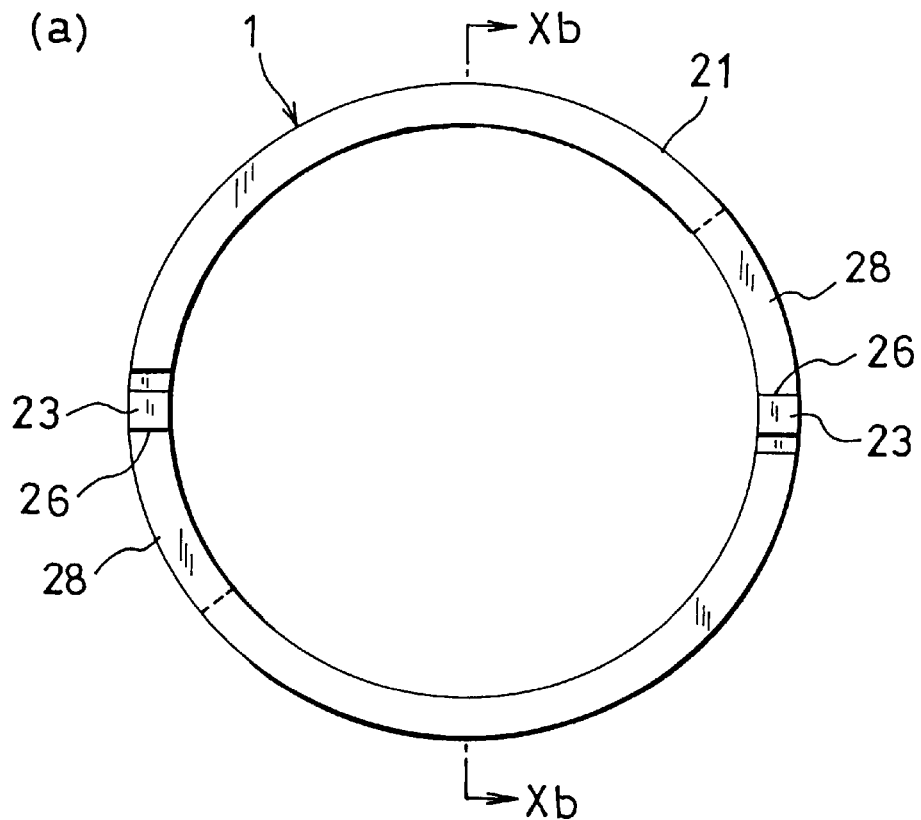
(b)
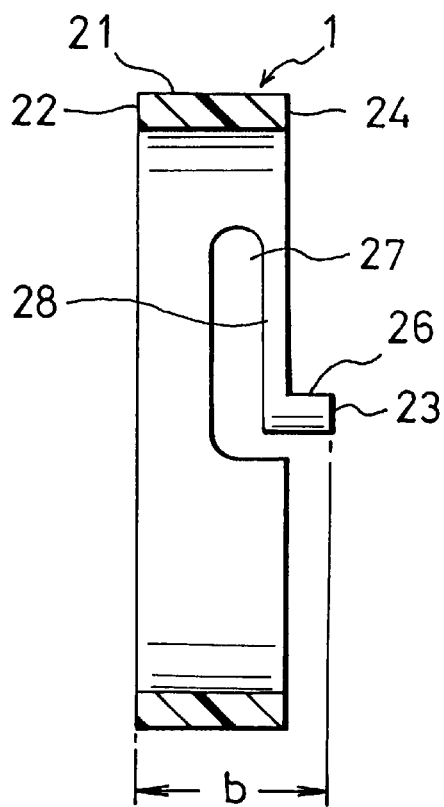

Fig. 11
(a)
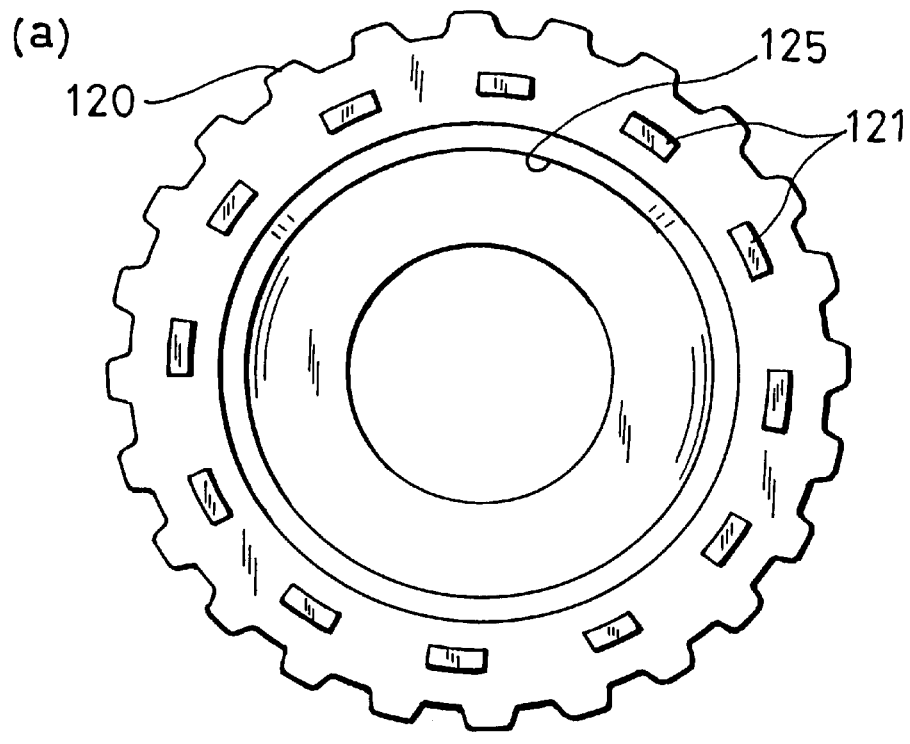
(b)
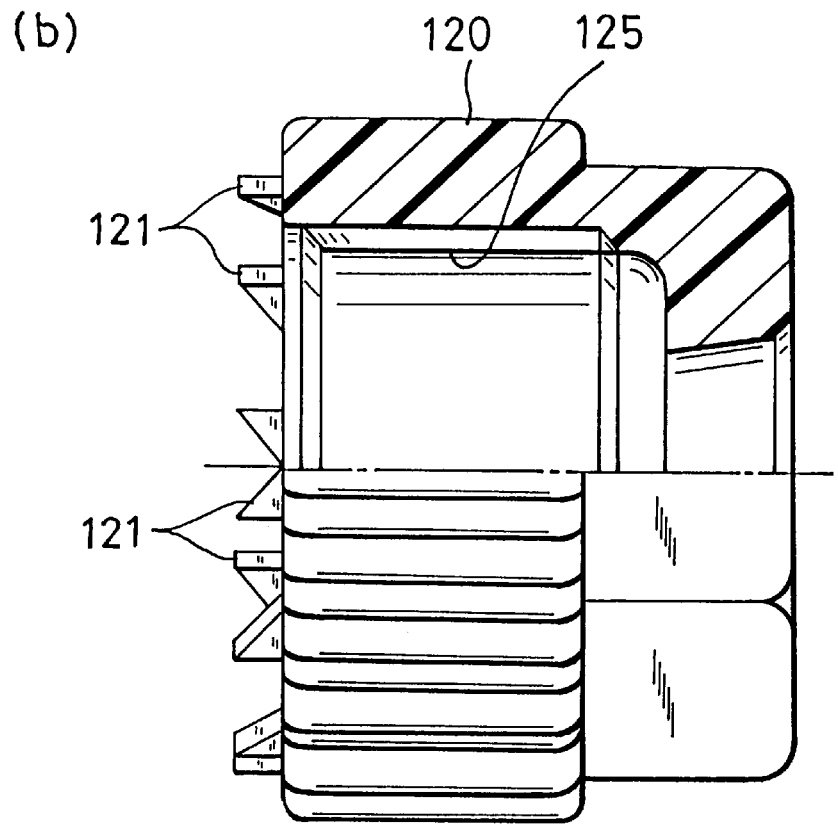

SYNTHETIC RESIN-MADE FASTENING-LIMITING DEVICE FOR A JOINT FASTENING MEMBER

BACKGROUND OF THE INVENTION

1. Field of the Invention

The present invention relates to a synthetic resin-made fastening-limiting device for a joint fastening member which fastens a pipe to be connected to a pipe receiving port on the side of a joint via a fastening member screwed to the pipe receiving port, thereby ensuring the sealing property and preventing the pipe from slipping off.

2. Description of the Prior Art

Piping for transporting a fluid which is used in a semiconductor production process is often required to have chemical resistance and corrosion resistance. In consideration of the particularity of the use environment, a synthetic resin-made pipe which has certain properties is used as piping of this kind. Similarly, as the material of joints which are interposed in many connecting and branching portions of such a pipe (including joints which are integrally attached to valves and the like connected to the pipe), synthetic resin is used having certain properties. In the connection of such a joint and the pipe, a connection structure is often employed in which, by the fastening force exerted by a fastening member such as a pressing ring screwed to a pipe receiving port on the side of the joint, the pipe inserted into the pipe receiving port is prevented from accidentally slipping off and the sealing property of the connection portion is ensured. In the connection structure, the function of preventing accidental slipping-off of the pipe due to the fastening of the fastening member, and the performance of ensuring the sealing property of the pipe connection portion are exerted only after the contact pressure which is generated by the fastening of the fastening member reaches a reference contact pressure.

When such a connection structure is employed, conventionally, means for defining the degree of the fastening force of the fastening member to an appropriate level in order to prevent the pipe from slipping off and ensure the sealing property is realized by a method such as that in which the fastening member is screwed by using a torque wrench, or that in which, when the fastening member is to be screwed to the pipe receiving port, the fastening member is caused to make a predetermined number of rotations.

However, such methods including the method in which a torque wrench is used, and that in which the fastening member makes a predetermined number of rotations have a problem in that these methods are cumbersome and require skill.

When existence/nonexistence of a forget of fastening of forgetting to fasten the fastening member, or the adequateness of the fastening state of the fastening member is to be determined, cumbersome checking must be conducted using tools and jigs. Therefore, it is difficult to completely eliminate an accident due to forgetting to fasten or a failure of fastening.

SUMMARY OF THE PRESENT INVENTION

The invention has been conducted under the circumstance described above.

It is an object of the present invention to provide a synthetic resin-made fastening-limiting device for a joint fastening member in which an appropriate screw amount of a fastening member at which the above-mentioned reference contact pressure is obtained can be determined without using a prior art method that is cumbersome and requires skill.

It is another object of the present invention to provide a synthetic resin-made fastening-limiting device for a joint fastening member in which forgetting to fasten a fastening member, or adequateness of the fastening state of the fastening member can be checked easily and rapidly.

It is a further object of the present invention to provide a synthetic resin-made fastening-limiting device for a joint fastening member in which a fastening member is prevented from being fastened at a degree exceeding an allowable fastening limit.

The synthetic resin-made fastening-limiting device for a joint fastening member according to the present invention is a fastening-limiting device for a fastening member which is screwed to a pipe receiving port on the side of a joint and fastens a pipe inserted into the pipe receiving port, wherein the device comprises: a ring portion which is fittable onto an outside of the pipe receiving port; a first abutting portion which is disposed on one end face in an axial direction of the ring portion and which is to abut against a reference face disposed on the side of the joint; a protrusion which protrudes from another end face in the axial direction of the ring portion; and a second abutting portion which is formed by a tip end of the protrusion, and which, when a fastening member that has a protruding confronting portion confronting the reference face and that is used for fastening the pipe is screwed to the pipe receiving port, abuts against the confronting portion. Preferably, the protrusion is disposed on a beam portion which is disposed in the ring portion by forming a void space in the ring portion and which is flexibly deformable. Preferably, a distance in the axial direction of the ring portion between the first and second abutting portions is equal to a gap between the reference face and the confronting portion at the time when a screw amount of the fastening member to the pipe receiving port reaches an appropriate value, and a distance between the first abutting portion which is in the one end face in the axial direction of the ring portion and the other end face in the axial direction of the ring portion is equal to the gap between the reference face and the confronting portion at a time when the screw amount of the fastening member to the pipe receiving port reaches a limit of screwing.

In the fastening-limiting device of the present invention, when the ring portion is fitted onto the outside of the pipe receiving port and the fastening member is screwed to the pipe receiving port, the protruding confronting portion of the fastening member pushes the fastening-limiting device to cause the first abutting portion to abut against the reference face on the side of the joint. In this state, in the fastening-limiting device, the first abutting portion abuts against the reference face on the side of the joint, and the second abutting portion or the other end face in the axial direction of the ring portion abuts against the confronting portion on the side of the fastening member.

In the above configuration, when the second abutting portion abuts against the confronting portion on the side of the fastening member and the beam portion is not flexibly deformed, the gap between the reference face and the confronting portion is equal to that between the first and second abutting portions of the fastening-limiting device, and hence the screw amount of the fastening member reaches an appropriate value. When the other end face in the axial direction of the ring portion abuts against the confronting portion on the side of the fastening member, the gap between the reference face and the confronting portion is equal to that between the first abutting portion of the fastening-limiting device and the other end face in the axial direction of the ring portion, and hence the screw amount of the fastening member reaches the limit of screwing.

The screwing position of the fastening member at a time when the screw amount of the fastening member reaches the appropriate value in the state in which the beam portion is not flexibly deformed is indicated as "the initial appropriate position," and the screwing position of the fastening member at a time when the screw amount of the fastening member reaches the limit of screwing is indicated as "the limit appropriate position." The screw amount of the fastening member at a time when the fastening member is located between the initial appropriate position and the limit appropriate position corresponds to an appropriate screw amount of the fastening member. When the fastening member is screwed by such an appropriate screw amount, it is possible to obtain the function of preventing accidental slipping-off of the pipe due to fastening of the fastening member, and the contact pressure at which the sealing property of the pipe connection portion is ensured.

In the case where the protrusion of the fastening-limiting device is disposed on the beam portion formed in the ring portion, when the fastening member is further screwed in immediately after the first abutting portion abuts against the reference face on the side of the joint and the fastening-limiting device is not co-rotated together with the fastening member, the protruding confronting portion of the fastening member pushes the protrusion of the fastening-limiting device to flexibly deform the beam portion, and, when the confronting portion overrides the protrusion, the beam portion returns to its original shape. When the fastening member is further screwed from the initial appropriate position, therefore, the protrusion is snapped by the confronting portion of the fastening member to produce a sound, before the fastening member reaches the limit appropriate position. Consequently, the worker who hears the sound can recognize that the screwed in amount of the fastening member enters the appropriate range. After the fastening member reaches the limit appropriate position, the ring portion blocks the forward movement of the fastening member, so that the fastening member cannot be further screwed in.

By contrast, when the first and second abutting portions do not abut against the reference face and the confronting portion, respectively, a gap exists between the ring portion and the reference face, or between the second abutting portion and the confronting portion. When the gap is visually observed, therefore, it is possible to immediately recognize that the fastening member is not screwed in by an appropriate amount. When such a gap cannot be visually observed, it is possible to immediately recognize that the fastening member is screwed in by an appropriate amount.

In the present invention, preferably, the protrusion is retractable to a back side of the other end face in the axial direction of the ring portion, by means of the flexible deformation of the beam portion. According to this configuration, there does not arise a situation in which, when the fastening member is screwed to the limit appropriate position, the protrusion of the ring portion impedes the screwing of the fastening member.

In the present invention, preferably, a convex portion is inwardly disposed at a predetermined place in a circumferential direction of the ring portion, and the convex portion is rotatably held by an annular groove which is formed in the pipe receiving port on the side of the joint. According to this configuration, since the convex portion disposed on the ring portion is held by the annular groove in the pipe receiving port on the side of the joint, the fastening-limiting device is prevented from easily slipping off from the pipe receiving port. Therefore, there does not arise a situation in which, during a work of connecting a pipe, the fastening-limiting device falls off and the workability is lowered.

In the present invention, preferably, the convex portion which is rotatably held by the annular groove is engageable with an engaging portion which is disposed at a predetermined place in a circumferential direction of the annular groove. In this case, when the convex portion of the ring portion of the fastening-limiting device is engaged with the engaging portion is disposed in the annular groove, the fastening-limiting device is surely prevented from being co-rotated together with the fastening member. Therefore, screwing of the fastening member causes the protruding confronting portion of the fastening member to snap the protrusion of the fastening-limiting device, so that a sound is surely generated. Consequently, the worker who hears the sound can surely recognize that the screwed in amount of the fastening member enters the appropriate range.

The confronting portion may be formed by rectangular or triangular protrusions which protrude respectively from plural places that are in the end face of the fastening member and arranged at regular angular intervals. Preferably, the confronting portion and the beam portion have a height of 0.5 to 2 mm, and 1 to 24 confronting portions are formed. Preferably, an inner diameter of the ring portion has a value which allows the ring portion to be loosely fitted onto the outside of the pipe receiving port on the side of the joint.

As described above, when the fastening-limiting device of the present invention is used, an appropriate screw amount of the fastening member at which the reference contact pressure is obtained can be surely determined without dispersion and without using a prior art method that is cumbersome and requires skill. When the fastening member is screwed in the protrusion is snapped and generates a sound, and at the same time a shock of the snap propagates to the hand of the worker which performs the work of screwing the fastening member. Therefore, the device has an advantage that, in accordance with the sound and the shock, the worker can accurately determine the appropriate screw amount of the fastening member. When the fastening-limiting device of the present invention is used, it is possible to attain an effect that forgetting fastening of the fastening member, or adequateness of the fastening state of the fastening member can be checked easily and rapidly. Furthermore, the fastening member which is screwed in by an appropriate amount can be further screwed in to the limit appropriate position.

Other various features and effects of the present invention will be further apparent from the following description of embodiments.

BRIEF DESCRIPTION OF THE DRAWINGS

FIG. 1(a) is a front view of a fastening-limiting device, and FIG. 1(b) is a section view taken along a line Ib—Ib of FIG. 1(a);

FIG. 2(a) is a front view of a fastening member, and FIG. 2(b) is a side view showing in section a part of the fastening member of FIG 2(a);

FIG. 3 is a side view showing a state in which the fastening-limiting device of FIGS. 1(a) and (b) is fitted to a pipe receiving port;

FIG. 4 is a side view showing the fastening member which is screwed to an initial appropriate position;

FIG. 8(*a*) is a longitudinal section view showing a modification of the fastening-limiting device, and FIG. 8(*b*) is a section view taken along a line VIIIb—VIIIb of FIG. 8(*a*);

FIG. 10(*a*) is a front view of a fastening-limiting device of another embodiment, and FIG. 10(*b*) is a section view taken along a line Xb—Xb of FIG. 10(*a*); and FIG. 11(*a*) is a front view of a fastening member of the modification, and FIG. 11(*b*) is a side view showing in section a part of the fastening member of FIG. 11(*a*).

DETAILED DESCRIPTION OF THE PREFERRED EMBODIMENT

Figure 7:
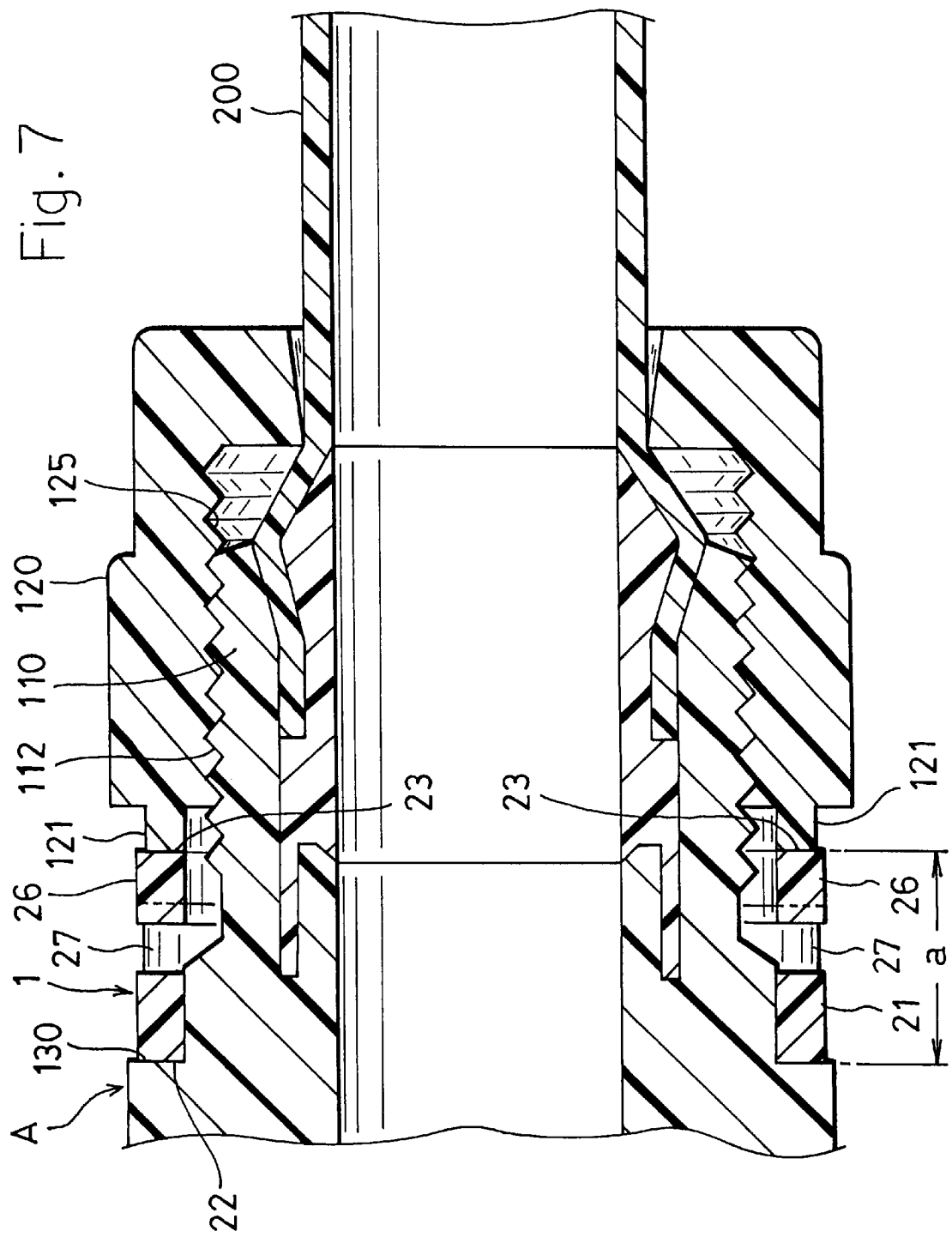
FIG. 7 is a partial longitudinal side section view showing a specific example of a structure where a joint and a pipe are connected.

The fastening-limiting device 1 of the present invention is used for a joint A having a structure which is exemplified in FIG. 7. The joint A includes a joint for connecting pipes together, and joints such as a pipe connecting port disposed in a pipe accessory itself such as a valve or a meter which is interposed at an adequate place in a pipe.

As shown in detail in FIG. 7, the joint A comprises a pipe receiving port 110 to which a pipe 200 is to be connected. When a female thread portion 125 of a fastening member 120 formed by a pressing ring is screwed by an appropriate amount to a male thread portion 112 of the pipe receiving port 110 so as to be fastened thereto, the pipe 200 which is previously inserted into the pipe receiving port 110 is fastened, thereby exerting functions that the sealing property of the connection portion between the pipe receiving port 110 and the pipe 200 is ensured, and that the pipe 200 is prevented from slipping off. An appropriate screw amount of the fastening member 120 at which such functions are satisfactorily exerted is within a fixed range. The joint A has a reference face 130 which is in the root portion of the pipe receiving port 110 and which extends in a direction perpendicular to the axis of the joint.

Confronting portions 121 which are opposed to the reference face 130 are disposed on the fastening member 120. As shown in FIGS. 2(*a*) and 2(*b*), in the illustrated fastening member 120, the confronting portions 121 are respectively formed by rectangular protrusions which protrude from plural places that are in the end face of the fastening member 120 and arranged at regular angular intervals. Preferably, the protruding confronting portions 121 have a height of 0.5 to 2 mm. Preferably, the number of the protruding confronting portions 121 is 1 to 24, and, more preferably, 8 to 16.

The fastening-limiting device 1 shown in FIGS. 1(*a*) and 1(*b*) has a ring portion 21. The inner diameter of the ring portion 21 has a value which allows the ring portion to be fitted onto the outside of the pipe receiving port 110 on the side of the joint A, and, preferably, loosely fitted onto the outside. In the ring portion 21, a first abutting portion 22 is formed on the one end in the axial direction of the ring portion and which is to abut against the reference face 130 on the side of the joint A. In the illustrated example, one end face in the axial direction of the ring portion 21 corresponds to the first abutting portion 22. Second abutting portions 23 are formed on the other end in the axial direction of the ring portion 21. The second abutting portions 23 are formed by tip ends of protrusions 26 which protrude from two places (alternatively, one place or two or more places) of the other end face 24 in the axial direction of the ring portion 21 and arranged at regular angular intervals, respectively. Each of the protrusions 26 is formed at the center of a beam portion 28 which is flexibly deformable. Each beam portion is disposed in the ring portion 21 by forming a long void space 27 in the ring portion 21 in the circumferential direction. Therefore, the beam portions 28 have elasticity peculiar to synthetic resin. The protrusions 26 are retractable to the back side of the other end face 24 in the axial direction of the ring portion 21, by means of the flexible deformation of the beam portions 28. Preferably, the beam portions 28 have a thickness of 0.5 to 2 mm.

In the fastening-limiting device 1, the gap (the gap in the case where the beam portions 28 are not flexibly deformed) a between the first and second abutting portions 22 and 23 in the axial direction of the ring portion 21, and the gap b between the first abutting portion of the ring portion 21 and the other end face 24 in the axial direction of the ring portion 21 are determined in the following manner.

The gap a between the first and second abutting portions 22 and 23 is equal to the gap between the reference face 130 and the confronting portions 121 at the time when, in the case where screwing of the fastening member 120 is advanced into the pipe receiving port 110, the sealing property and the slipping-off preventing function are initially exerted. The screwing position of the fastening member 120 at which the functions are initially exerted is "the initial appropriate position." The gap b between the first abutting portion of the ring portion 21 and the other end face 24 in the axial direction of the ring portion 21 is equal to the gap between the reference face 130 and the confronting portions 121 which gap is the limit of, when screwing of the fastening member 120 is advanced into the pipe receiving port 110 while exceeding the initial appropriate position, surely exerting the above-mentioned functions. The screwing position of the fastening member 120 at which the gap is formed is "the limit appropriate position." Therefore, the fastening member 120 is located between the initial appropriate position and the limit appropriate position. In other words, when the gap between the reference face 130 and the confronting portions 121 is in the range of the difference c (c=a−b) of the gaps, the screw amount of the fastening member 120 corresponds to an appropriate screw amount of the fastening member 120. When the fastening member 120 is screwed by such an appropriate screw amount, it is possible to attain the function of preventing accidental slipping-off of the pipe 200 due to fastening of the fastening member 120, and a contact pressure at which the performance of ensuring the sealing property of the pipe connection portion is obtained.

The screw amount of the fastening member 120 is appropriately adjusted in the following manner by using the fastening-limiting device 1 which has been described with reference to FIG. 1. As shown in FIG. 3, the fastening-limiting device 1 is fitted onto the outside of the pipe receiving port 110 on the side of the joint A. The fastening member 120 which is previously fitted onto the pipe 200 is screwed on to the pipe receiving port 110. The pipe 200 is previously inserted into the pipe receiving port 110.

As a result, the fastening member 120 screwed to the pipe receiving port 110 pushes the fastening-limiting device 1 to cause the first abutting portion 22 of the fastening-limiting device 1 to abut against the reference face 130 on the side of the joint A as shown in FIG. 4. FIG. 4 shows a state in which the protruding confronting portions 121 of the fastening member 120 push the second abutting portions 23 of the fastening-limiting device 1. In the state shown in FIG. 4, the first abutting portion 22 of the fastening-limiting device 1 abuts against the reference face 130, and the second abutting portions 23 of the device 1 abut against the confronting portions 121 on the side of the fastening member 120. The beam portions 28 are not flexibly deformed. Therefore, the gap between the reference face 130 and the confronting portions 121 is equal to the gap a between the first and second abutting portions 22 and 23 in the axial direction of the ring portion 21, and the fastening member 120 reaches the initial appropriate position. Consequently, the above-mentioned sealing property and slipping-off preventing function are exerted. Before the fastening member 120 reaches the initial appropriate position, the fastening-limiting device 1 may be co-rotated together with the fastening member 120. Even when such a co-rotation occurs, there arises no problem.

Figure 5:
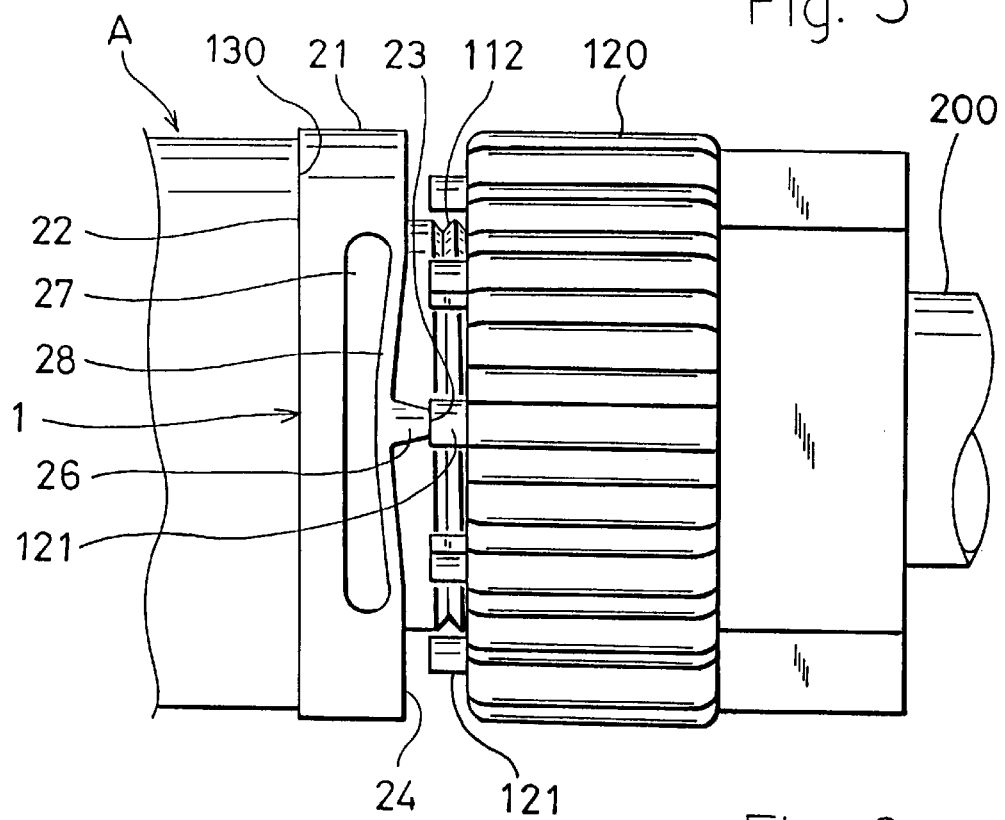
FIG. 5 is a side view showing a state in which the screw amount of the fastening member is appropriately adjusted.

When the first abutting portion 22 of the fastening-limiting device 1 abuts against the reference face 130 as shown in FIG. 4, a friction resistance is produced in the abutting place. Therefore, the fastening-limiting device 1 is hardly co-rotated even when the fastening member 120 screwed in further. When the fastening member 120 is screwed in further immediately after further co-rotation of the fastening-limiting device 1 is inhibited, the protruding confronting portions 121 of the fastening member 120 push the protrusions 26 of the ring portion 21, thereby causing the beam portions 28 to be flexibly deformed as shown in FIG. 5. When the confronting portions 121 override the protrusions 26, the beam portions 28 return to their original shape. Therefore, the protrusions 26 are snapped by the confronting portions 121 to produce a sound, and at the same time a shock associated with the snap is transmitted to the hand. Consequently, the worker senses the sound and the shock and recognizes that the screw amount of the fastening member has entered the appropriate range. This function is exerted more satisfactorily in the case where the height of the confronting portions 121 and the thickness of the beam portions 28 are in the range of 0.5 to 2 mm, as compared with the case where the height of the confronting portions 121 and the thickness of the beam portions 28 are smaller than 0.5 mm or larger than 2 mm. It was confirmed that, when the number of the protruding confronting portions 121 is 1 to 24 or, preferably, 8 to 16, the function is exerted more satisfactorily than the case where the protruding confronting portions 121 is 25 or more.

Figure 6:
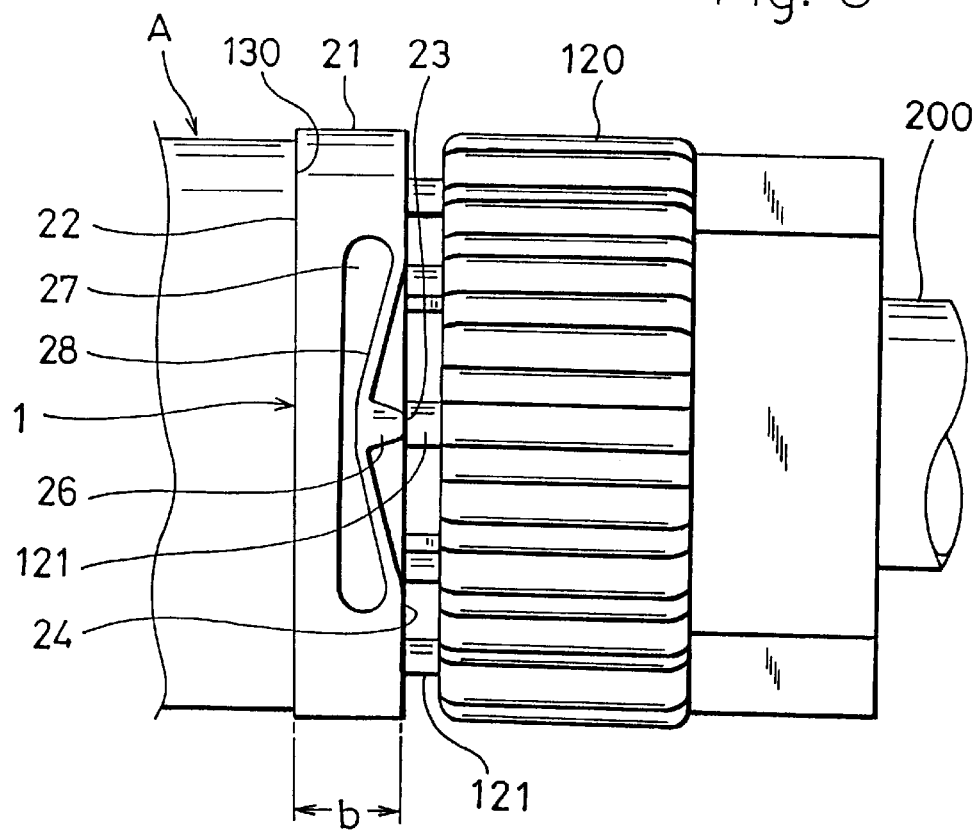
FIG. 6 is a side view showing the fastening member which is screwed to a limit appropriate position.

In the case where the fastening member 120 is screwed in further after the protrusions 26 are snapped by the confronting portions 121, when the protrusions 26 of the fastening-limiting device 1 are pushed by the confronting portions 121 of the fastening member 120, the beam portions 28 are flexibly deformed, so that the protrusions 26 are retracted to the same level as that of the other end face 24 in the axial direction of the ring portion 21. In a similar case, when the protrusions 26 of the fastening-limiting device 1 are pushed by the end face of the fastening member 120, the beam portions 28 are flexibly deformed so that the protrusions 26 are retracted toward the level of the other end face 24 in the axial direction of the ring portion 21. As shown in FIG. 6, therefore, the confronting portions 121 abut against the other end face 24 in the axial direction of the ring portion 21, and the fastening member 120 reaches the limit appropriate position. After the fastening member 120 reaches the limit appropriate position in this way, the ring portion 21 blocks the forward movement of the fastening member 120, with the result that the fastening member 120 cannot be screwed in further.

In the above-described configuration, the position of the a fastening member 120 at the time when the protrusions 26 are snapped by the confronting portions 121 to produce a sound is between the initial appropriate position and the limit appropriate position. When the protrusions 26 are snapped by the confronting portions 121 and a sound is produced, therefore, it is possible to obtain the function of preventing accidental slipping-off of the pipe 200 due to fastening of the fastening member 120, and the contact pressure at which the sealing property of the pipe connection portion is ensured. Consequently, it is preferable to stop the operation of screwing the fastening member 120 when the protrusions 26 are snapped by the confronting portions 121 and a sound is produced.

By contrast, when the first abutting portion 22 of the fastening-limiting device 1 does not abut against the reference face 130, a gap exists between the first abutting portion 22 and the reference face 130. When the gap is visually observed, therefore, it is possible to immediately recognize that the fastening member 120 is not screwed in by an appropriate amount. When such a gap cannot be visually observed, it is possible to immediately recognize that the fastening member 120 is screwed in by an appropriate amount.

FIGS. 8(a) and (b) show a modification of the fastening-limiting device 1. In the fastening-limiting device 1 of FIG. 8, a claw-like convex portion 29 is inwardly disposed at a predetermined place (one or two places) in the circumferential direction of the ring portion 21. At both sides of convex portion 29, slit-like openings 29a and 29a are formed in the ring portion 21 (FIG. 8b). Therefore, the convex portion 29 can be easily elastically deformed outwardly and inwardly with respect to the ring portion 21.

Figure 9:
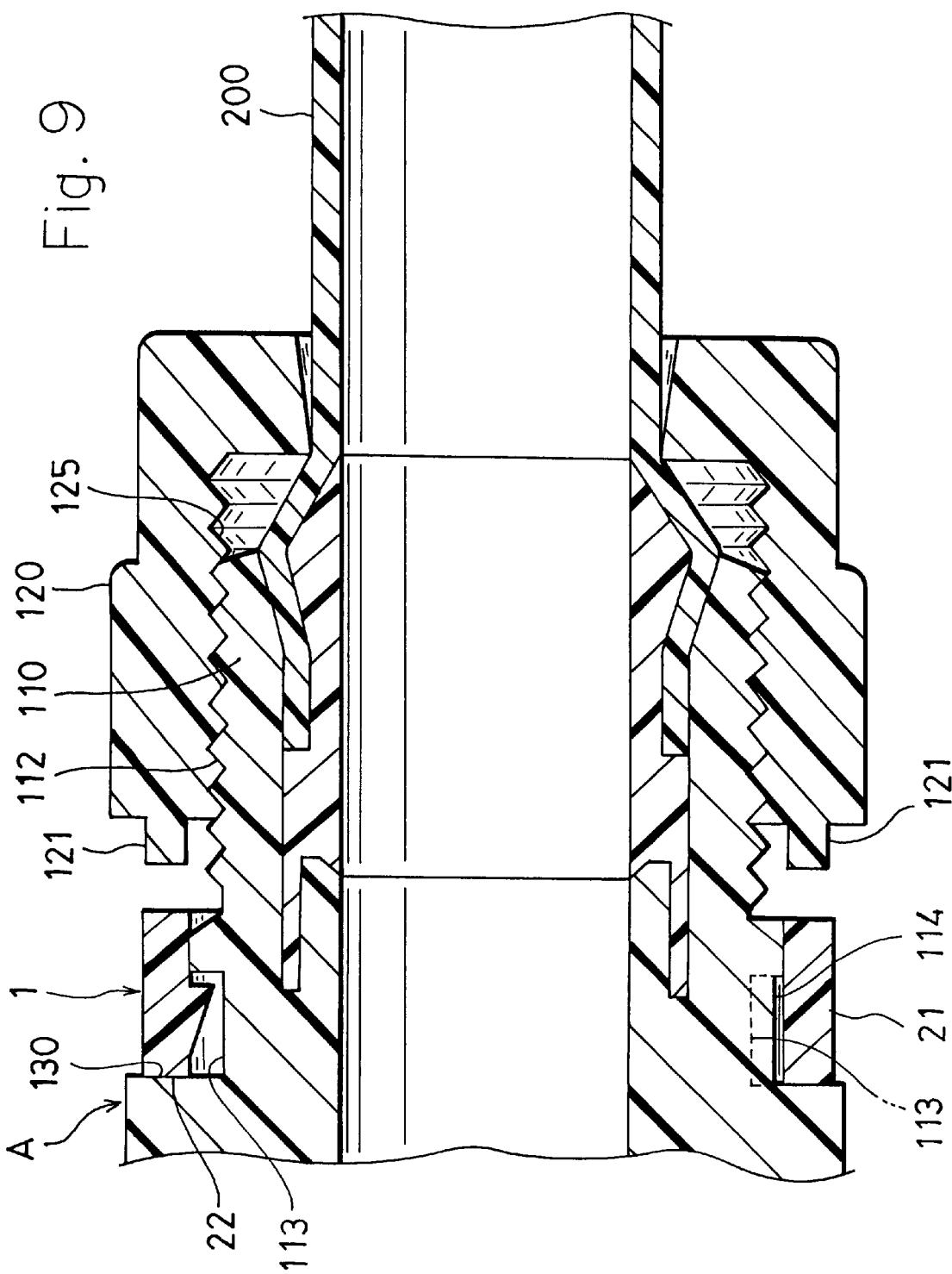
FIG. 9 is a partial longitudinal side section view showing a specific example of a structure of connecting a joint with a pipe in which the fastening-limiting device of FIGS. 8(*a*) and (*b*) is used.

FIG. 9 shows the joint A using the fastening-limiting device 1 of FIGS. 8(a) and (b). In the joint A, an annular groove 113 is formed in the root portion of the pipe receiving port 110. The convex portion 29 of the fastening-limiting device 1 which is fitted onto the outside of the pipe receiving port 110 is rotatably held by the annular groove 113. Since the convex portion 29 can be easily elastically deformed outwardly and inwardly with respect to the ring portion 21 as described above, the convex portion 29 is easily fitted into the annular groove 113 by fitting the fastening-limiting device 1 onto the outside of the pipe receiving port 110. An engaging portion 114 protrudes from a predetermined place (for example, one place) in the circumferential direction of the annular groove 113. The convex portion 29 is engageable in the rotation direction of the convex portion, with the engaging portion 114.

According to this configuration, the co-rotation of the fastening-limiting device 1 in the case where the fastening member 120 is screwed in is blocked by the engagement of the convex portion 29 and the engaging portion 114. Therefore, screwing of the fastening member 120 causes the protruding confronting portions 121 of the fastening member 120 to snap the protrusions 26 of the fastening-limiting device 1, so that a sound is surely generated. Consequently, the worker who hears the sound can surely recognize that the screw amount of the fastening member enters the appropriate range.

The other configuration is identical with that which has been described with reference to FIGS. 1(a) and (b) to 7. In FIGS. 8(a) and (b) and FIG. 9, therefore, the identical components are designated by the same reference numerals used in FIGS. 1(a) and (b) to FIG. 7, and their description is omitted.

As the material of the fastening-limiting device 1, polyethylene resin, polypropylene resin, polyvinyl chloride resin, or fluororesin such as PFA, PVDF, or ETFE may be suitably used. Particularly when the fastening-limiting device 1 is made of fluororesin, the fastening-limiting device has the following advantage because of the high melting point of fluororesin. Even when the fastening-limiting device 1 is used in the adjustment of the screw amount of the fastening member 120 and thereafter remains to be fitted onto the pipe receiving port 110, therefore, there is no fear that the fastening-limiting device 1 will melt because of a thermal effect of a high-temperature fluid.

In the fastening-limiting device 1, the void spaces 27 having a shape which is formed by boring a hole in a part of the ring portion 21 are formed to provide the ring portion 21 with the beam portions 28 which are supported at both ends, and the protrusions 26 are formed at the centers of the beam portions 28. This structure may be replaced with that in which, as shown in FIGS. 10(a) and 10(b), the void spaces 27 having a shape which are formed by depressedly removing the ring portion 21 are formed to provide the ring portion 21 with cantilever beam portions 28, and the protrusions 26 may be formed at the end portions of the beam portions 28. As shown in FIGS. 11(a) and 11(b), the confronting portions 121 of the fastening member 120 may have a triangular shape.

What is claimed is:

1. A fastening-limiting device for a fastening member, the fastening member being screwed to a pipe receiving port on the side of a joint and fastening a pipe inserted into the pipe receiving port, the pipe receiving port having an outside, wherein said fastening-limiting device comprises:
   a ring portion fitted onto the outside of the pipe receiving port, said ring portion having a beam disposed thereon;
   a first abutting portion disposed on one end face in an axial direction of said ring portion and abuts against a reference face disposed on the side of the joint;
   a protrusion which protrudes from another end face in the axial direction of said ring portion; and
   a second abutting portion formed by a tip end of said protrusion, wherein the fastening member has a protruding confronting portion confronting the reference face, the fastening member being screwed to the pipe receiving port and being used for fastening the pipe, said second abutting portion being adapted to abut against the protruding confronting portion, and wherein said protrusion is disposed on said beam portion which is formed by forming a void space in said ring portion, said beam portion and consequently said protrusion being flexibly deformable.

2. A fastening-limiting device for a fastening member according to claim 1, wherein a distance in the axial direction of said ring portion between said first and second abutting portions is equal to a gap between the reference face and the protruding confronting portion at the timing when a screw amount of the fastening member to the pipe receiving port is such that the sealing property and the slipping-off preventing function are initially exerted reaches an appropriate value, and a distance between the first abutting portion which is in said one end face in said axial direction of said ring portion and the other end face in said axial direction of said ring portion is equal to said gap between the reference face and the protruding confronting portion at the timing when the screw amount of the fastening member to the pipe receiving port reaches a limit of screwing.

3. A fastening-limiting device for a fastening member according to claim 1, wherein said protrusion is retractable to the other end face defining said void space in the axial direction of said ring portion, by means of the flexible deformation of said beam portion.

4. A fastening-limiting device for a fastening member according to claim 1, wherein the protruding confronting portion is formed by protrusions protruding from the end face of the fastening member.

5. A fastening-limiting device for a fastening member according to claim 4, wherein the protruding confronting portion has a height of 0.5 to 2 mm.

6. A fastening-limiting device for a fastening member according to claim 4, wherein said device comprises 1 to 24 protruding confronting portions.

7. A fastening-limiting device for a fastening member according to claim 1, wherein a convex portion is inwardly disposed at a predetermined place in a circumferential direction of said ring portion, and said convex portion is rotatably held by an annular groove which is formed in the pipe receiving port on the side of said joint.

8. A fastening-limiting device for a fastening member according to claim 7, wherein said convex portion which is rotatably held by said annular groove is engageable with an engaging portion which is disposed at a predetermined place in a circumferential direction of said annular groove.

9. A fastening-liming device for a fastening member according to claim 1, wherein the protruding confronting portion is formed by rectangular protrusions which protrude respectively from plural places that are in the end face of the fastening member and arranged at regular angular intervals.

10. A fastening-limiting device for a fastening member according to claim 1, wherein the protruding confronting portion is formed by triangular protrusions which protrude respectively from plural places that are in the end face of the fastening member and arranged at regular angular intervals.

11. A fastening-limiting device for a fastening member according to claim 1, wherein an inner diameter of said ring portion has a value which allows said ring portion to be loosely fitted onto the outside of the pipe receiving port on the side of said joint.

12. A fastening-limiting device for a fastening member according to claim 1, wherein said beam portion has a thickness of 0.5 to 2 mm.

13. A fastening-limiting device and a fastening member for a joint having a pipe receiving port, the joint serving to fasten a pipe brewed to the pipe receiving port, comprising:
   a ring portion fitted onto the pipe receiving port, said ring portion having a beam disposed thereon formed by forming a void space in said ring portion;
   a first abutting portion disposed on one end face in an axial direction of said ring portion, said one end face abutting against a reference face disposed on one side of the joint;
   a protrusion which protrudes from another end face of said ring portion in the axial direction of said ring portion; and
   a second abutting portion formed by a tip end of said protrusion, wherein said fastening member has a protruding confronting portion confronting the reference face, said fastening member being screwed to the pipe receiving port and being used for fastening the pipe, said second abutting portion being adapted to abut against the protruding confronting portion, and wherein said protrusion is disposed on said beam portion and is flexibly deformable along with said beam portion.

* * * * *

UNITED STATES PATENT AND TRADEMARK OFFICE
CERTIFICATE OF CORRECTION

PATENT NO. : 6,142,535
DATED : November 7, 2000
INVENTOR(S) : Kiyoshi Nishio et al It is certified that error appears in the above-indentified patent and that said Letters Patent is hereby corrected as shown below:

Claim 2, line 58, "reaches an appro-" should be deleted; and
      line 59, "priate value, and a distance" should be deleted.

Claim 9, line 25, "liming" should be "limiting".

Claim 13, line 45, "brewed" should be "screwed".

Signed and Sealed this

Twenty-ninth Day of May, 2001

*Attest:*

NICHOLAS P. GODICI

*Attesting Officer*    *Acting Director of the United States Patent and Trademark Office*